June 4, 1968

T. J. MACKU ETAL 3,386,539

TWO-WAY AUTOMATIC BRAKE ADJUSTER
ARRANGEMENT FOR HOPPER CARS

Filed April 19, 1967

INVENTORS
THOMAS J. MACKU
ELDRED H. NATSCHKE
BY Mann, Brown, McWilliams
ATT'YS.

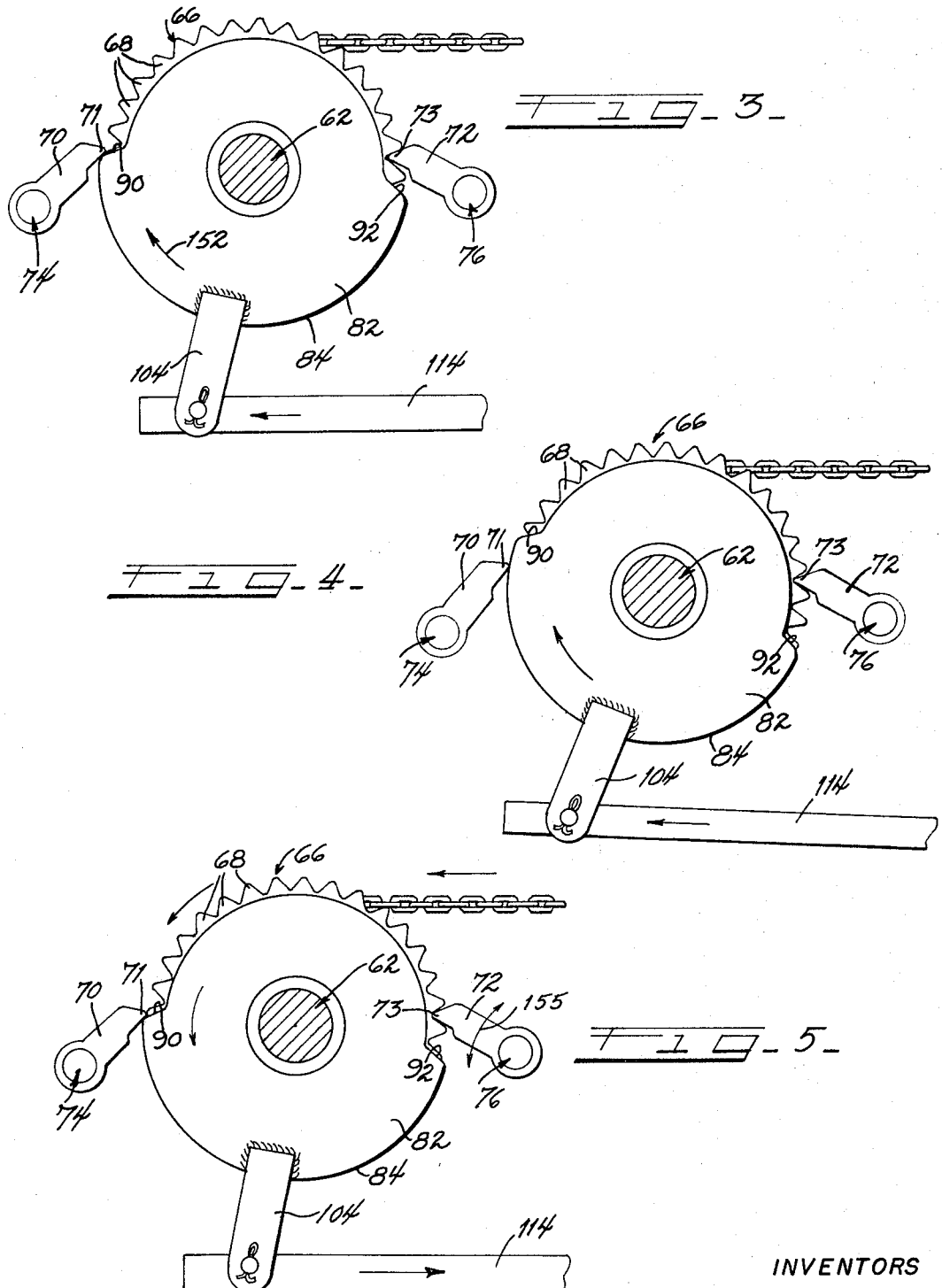

June 4, 1968
T. J. MACKU ET AL
TWO-WAY AUTOMATIC BRAKE ADJUSTER
ARRANGEMENT FOR HOPPER CARS
3,386,539
Filed April 19, 1967
3 Sheets-Sheet 3
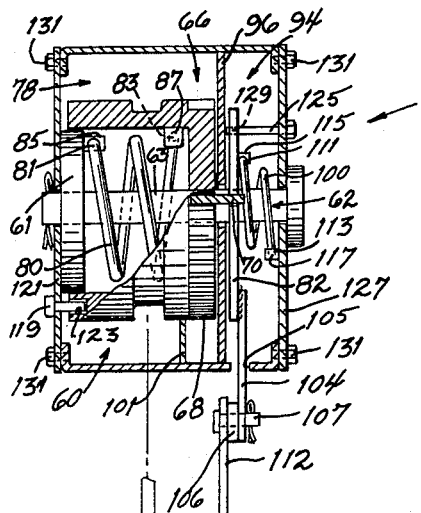
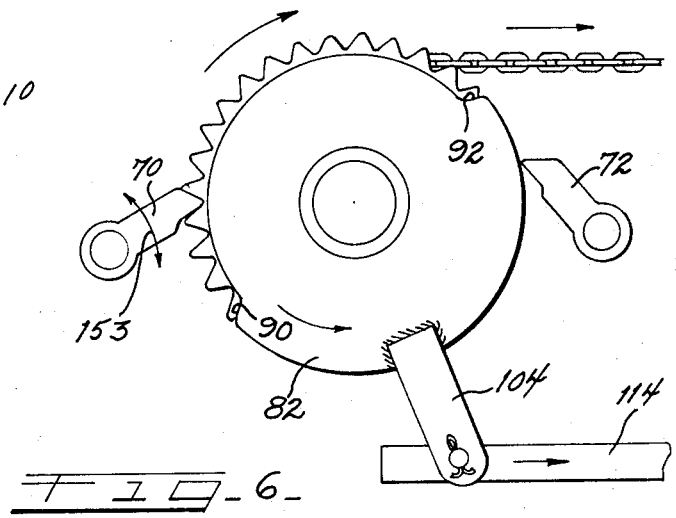
FIG. 6.
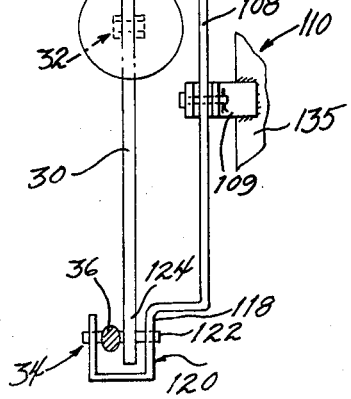
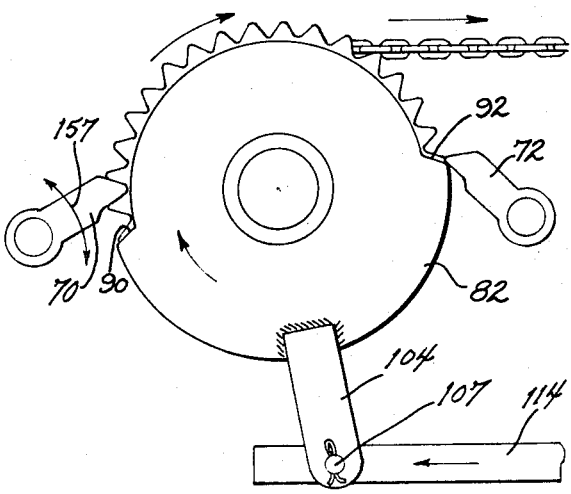
FIG. 8.
FIG. 7.
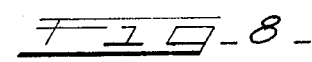
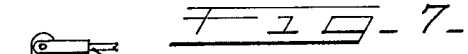
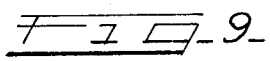
FIG. 9.
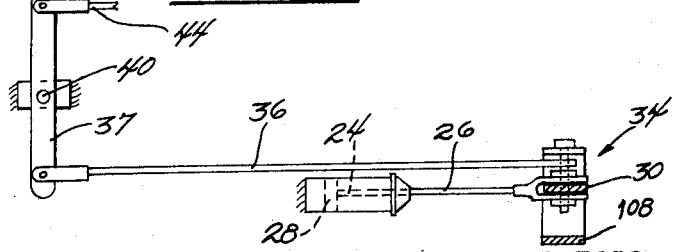
INVENTORS
THOMAS J. MACKU
ELDRED H. NATSCHKE
BY Mann, Brown, McWilliams
ATT'YS.

United States Patent Office 3,386,539
Patented June 4, 1968

3,386,539
TWO-WAY AUTOMATIC BRAKE ADJUSTER ARRANGEMENT FOR HOPPER CARS
Thomas J. Macku, Bourbonnais, and Eldred H. Natschke, Worth, Ill., assignors to Universal Railway Devices Co., a corporation of Delaware
Filed Apr. 19, 1967, Ser. No. 632,094
3 Claims. (Cl. 188—198)

ABSTRACT OF THE DISCLOSURE

This invention relates to a brake adjuster arrangement for hopper cars arranged for automatic operation in both slack take up and let out directions and having the adjuster itself mounted at the end of the car under the end slope sheet but well above the center sill of the car. The brake adjuster itself includes a pair of control pawls cooperating with a ratchet wheel keyed to the drum and operated by a cam plate coupled to the rigging through a trigger mechanism that controls the positioning of the cam plate and thus the operation of the pawls in releasing the drum for movement in slack take up and let out directions and holding same against such movement during operation of the rigging. The adjuster arrangement involves an adjuster of this type mounted at each end of the hopper car in association with separate brake rigging for the wheels of each car truck including a brake cylinder and cylinder lever for each adjuster, with the brake cylinders being operated through a common air reservoir.

Foundation brake rigging for hopper cars conventionally includes an adjuster positioned near the bottom of the center sill at some position between the bolsters, usually between the dual outlets of one of the hoppers that are ordinarily positioned on either side of the center sill.

Heretofore there has been much difficulty experienced with hopper car adjusters, and especially those of open hopper cars, due to the fact that in the winter months the materials being carried arrive frozen and need to be thawed before they can be discharged from the car.

A common practice used to thaw out the materials to be discharged is to build a fire sufficiently adjacent to the hopper outlets so that the heat has the desired effect. Due to the customary location of the hopper car adjuster near one or more of the hopper outlets, adjusters not infrequently are over-exposed to the heat, which has the effect of taking the "tension" out of the adjuster springs, boiling the grease with which the adjuster is charged, and distorting the adjuster parts.

More sophisticated heating methods call for a train of hopper cars to be slowly moved through a heated area where open gas flames are played on the hopper slope sheets, and while more care is taken in such systems to avoid damaging the adjuster and other equipment, the nearby presence of such extreme heat continues to cause similar adjuster damage even if to a lesser degree.

The special requirements for hopper car brake rigging has heretofore made brake adjusters suitable for other types of cars unsuitable for hopper cars, and adjusters specifically designed for hopper cars ordinarily are automatic in the slack take up direction only, requiring manual re-setting of the adjuster when the brake shoes are changed.

A principal object of this invention is to provide a brake adjuster arrangement that is especially adapted for hopper car use and that when employed in hopper car brake rigging permits the adjuster to be applied in an out of the way position at the end of the car.

Another principal object of the invention is to provide a brake adjuster arrangement for hopper cars that is automatic for both slack take up and let out.

Still another principal object of the invention is to provide a brake rigging arrangement for hopper cars in which the adjuster is positioned well above the center sill and adjacent but under the car end slope sheet, and thus well out of range of any open flames that may be applied to the car hoppers for thawing purposes.

Further objects of the invention are to provide a rotary type adjuster that is fully automatic for both slack take up and let out, to provide an adjuster arrangement that permits a new approach in hopper car brake rigging arrangements, and to provide an adjuster and rigging therefor that is economical of manufacture, convenient to install, and adaptable for application to a wide variety of hopper car arrangements.

Other objects, uses, and advantages will be obvious or become apparent from a consideration of the following detailed description and the application drawings.

In the drawings:

FIGURE 3 is a view similar to that of FIGURE 2, but illustrating the operation of the principal parts of the adjuster in diagram form at the brake setting position;

FIGURE 4 is similar to FIGURE 3 but illustrates the position of the adjuster parts at the adjuster overtravel or take up position, that is, at the end of the power stroke;

FIGURE 5 is similar to FIGURES 3 and 4 but illustrates the functioning of the adjuster parts as the rigging returns from its overtravel position to its running position, and slack take up is being effected to compensate for brake shoe wear;

FIGURE 6 is similar to FIGURES 3–5 but illustrates the positioning of the brake adjuster parts that is effected by replacement of the brake shoes with new shoes;

FIGURE 7 is similar to the showing of FIGURE 6 but illustrates the operation of the brake adjuster in effecting slack let out on the first brake application after the brake shoes have been replaced;

FIGURE 8 is a cross-sectional view substantially along line 8—8 of FIGURE 1 showing the adjuster and related brake rigging components; and FIGURE 9 is a diagrammatic cross-sectional view substantially along line 9—9 of FIGURE 1 and illustrating a part of the brake rigging that connects the brake cylinder to the trucks.

Figure 1:
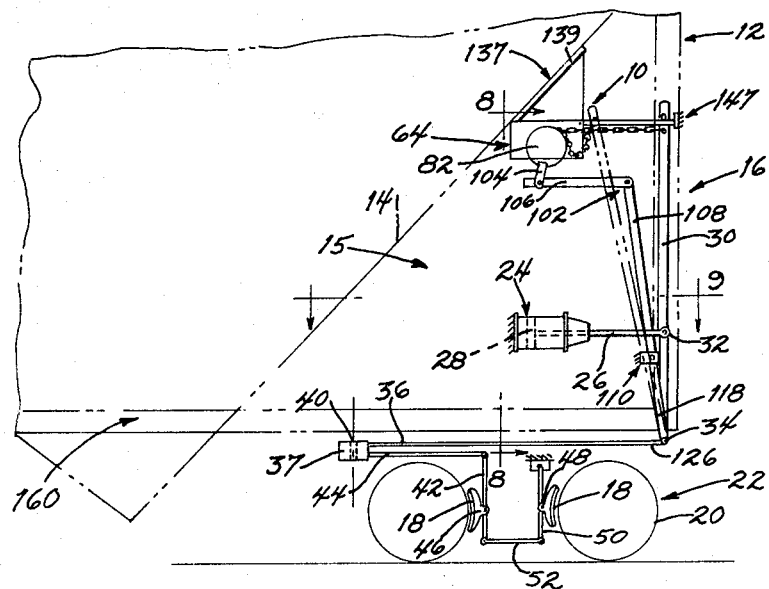
FIGURE 1 is a diagrammatic fragmental view showing one end of the hopper car in outline and illustrating the manner in which the brake adjuster of this invention may be applied to the car as part of the car brake rigging with the rigging full line position illustrating its brake setting position and the rigging dashed line position illustrating its release or riding position.

However, it is to be understood that the drawing figures provided are supplied primarily to comply with the requirements of the patent code and that the invention may have other specific embodiments that will be obvious to those skilled in the art and that are intended to be covered by the appended claims.

Reference numeral 10 of FIGURE 1 indicates the brake adjuster of the present invention as secured in any suitable manner at the end of hopper car 12 beneath the end slope sheet 14 and in the triangular working space 15 defined by same and the car center sill as part of a hopper car brake rigging arrangement 16 arranged in accordance with this invention for applying or drawing brake shoes 18 against the wheels 20 of a conventional truck 22.

General description

The brake rigging 16 includes the customary air actuated brake cylinder 24 that is secured to the car in working space 15 in any suitable manner and includes a thrust or piston rod 26 that is actuated by its piston 28 and is pivotally connected to cylinder lever 30, positioned in working space 15 (adjacent its larger end), as at 32 which is in turn pivotally connected as at 34 to connecting rod 36 pivotally connected to one end of a lever 37 (see FIGURE 9) mounted for pivotal movement about the stationary axis 40, with the other end of the lever 37 being connected to actuating live truck lever 42 by a top rod 44. The live truck lever 42 operates one of the brake beams 46 to which two of the brake shoes 18 is attached and the other brake beam 48 is actuated by being connected to truck dead lever 50 which is actuated by a bottom rod 52 connected between the levers 42 and 50.

The brake adjuster

The brake adjuster 10 generally comprises a brake drum or sheave 60 (see FIGURE 8) of the general type shown in Wilson Patent No. 2,562,226 journalled for rotation in any suitable manner within a suitable housing 64. In the form shown, the drum 60 is journalled at one end thereof on boss 61 of housing 64 and at the other end thereof on the mid-portion 63 of pin 62 that is suitably mounted in housing 64.

The drum or sheave 60 has keyed thereto for rotation therewith ratchet wheel 66 formed with ratchet teeth 68. In the form shown, the ratchet wheel 66 and sheave or drum 60 are integrally united, but they alternately can be separate components otherwise suitably keyed together.

Cooperating with the ratchet teeth 68 of the ratchet wheel 66 are a pair of opposed unidirectional acting pawls 70 and 72 that are pivotally mounted as at 74 and 76, respectively, in the housing. Pawl 70 may be termed a working pawl and pawl 72 may be termed a holding pawl.

In the form shown, the housing 64 defines a drum or sheave chamber 78 (see FIGURE 8) in which the drum and ratchet wheel are operably mounted. A suitable torsion spring 80 connected between the drum 60 and the housing 64 (see FIGURE 8) biases the drum or sheave for counterclockwise rotation in the showing of FIGURES 1–7. In the form shown, spring 80 is mounted within drum 60 and has its ends 81 and 83 suitably made fast to lugs 85 and 87 of the housing 64 and drum 60, respectively.

Also journalled for rotation on the pin 62 is a cam plate 82 formed with a circumambient cam surface 84 that cooperates with the working ends 71 and 73 of the respective pawls 70 and 72 to lift them from engagement with the respective ratchet wheel teeth 68 and return them to such engagement in the manner indicated in FIGURES 3–7.

The cam plate cam surface 84 thus defines a sector 86 for holding the respective pawls out of engagement with the ratchet wheel teeth 68, a sector 88 that is of reduced diameter and permits the pawls 70 and 72 to return to engagement with the ratchet wheel teeth 68, and shoulder forming segments 90 and 92 that serve to guide the pawls 70 and 72 between the two sectors 86 and 88.

Figure 2:
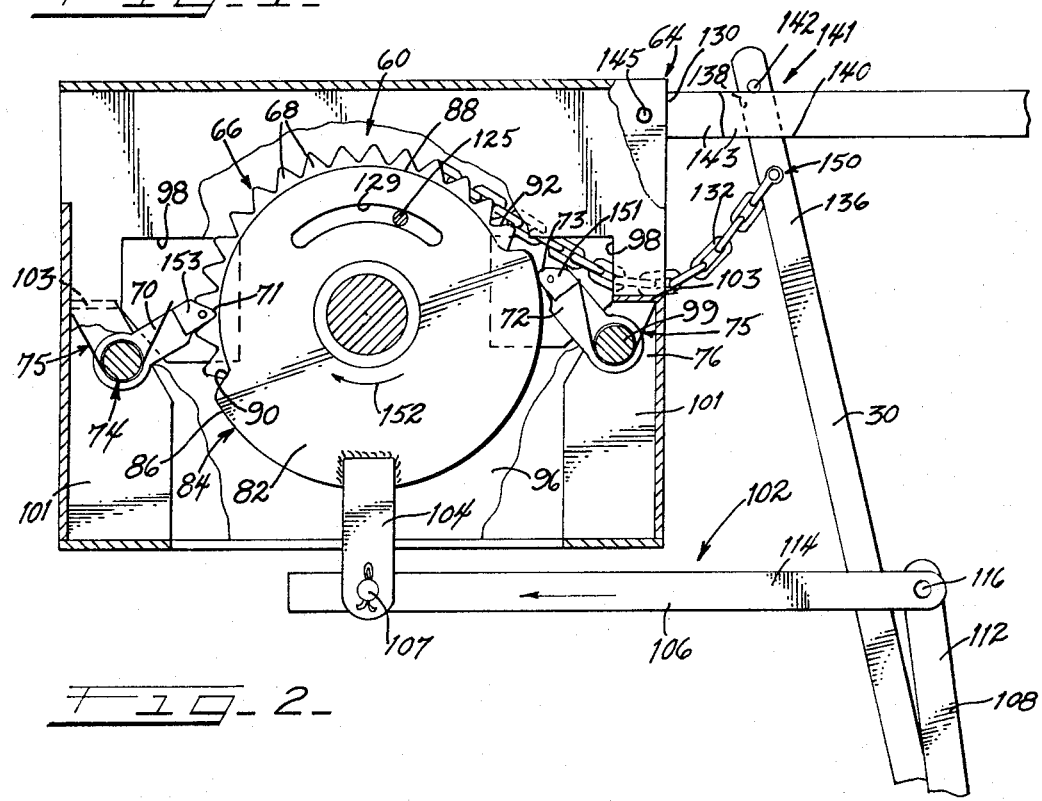
FIGURE 2 is an elevational view of the adjuster unit employed in the showing of FIGURE 1, showing same on a larger scale and with parts broken away to expose other parts, and showing the running position of the adjuster.

Pawls 70 and 72 are biased into engagement with the ratchet teeth 68 and cam plate surface 84 by suitable resilient means, such as the respective torsion springs 75 which act in the manner indicated in FIGURE 2 between the respective pawls and the housing.

As indicated in FIGURES 2 and 8, the housing 64 in addition to chamber 78 also defines a cam plate chamber 94 in which the cam plate 82 is journalled. The housing wall 96 which defines the two chambers 78 and 94 is formed with windows 98 (see FIGURE 2) through which the ends 71 and 73 of the respective pawls 70 and 72 extend laterally thereof from the chamber 78 into chamber 94 for engagement with the cam surface 84. Pawls 70 and 72 are identical but reversed in position and are pivotally mounted in place in any suitable manner, as by their respective pins 99 being applied between the housing wall 96 and adjacent wall structure 101 in chamber 78 that are braced by cross pieces 103 (see FIGURE 2).

Also mounted in the cam plate chamber 94 is torsion spring 100 which is connected between the cam plate 82 and the housing 64 in a manner to bias the cam plate for counterclockwise rotation in the showing of FIGURES 2–7. In the form shown, the ends 111 and 113 of spring 100 are suitably connected to lugs 115 and 117 of the cam plate and housing, respectively.

The movement of drum 60 and cam plate 82 under the biasing action of their respective torsion springs is preferably limited by suitable stop means so that these elements are maintained under a predetermined minimum load or bias. In the form shown, bolt 119 of housing end plate 121 rides in groove 123 of the drum, with groove 123 being proportioned about the axis of drum 60 to provide the range of movement desired. Bolt 125 of housing end plate 127 rides slot 129 formed in the cam plate 82, with slot 129 being proportioned about the axis of the cam plate to give the movement desired. End plates 121 and 127 are secured in place by appropriate bolts 131.

The adjuster 10 in accordance with this invention is coupled into brake rigging 16, and brake rigging 16 is arranged in such a manner, that the adjuster may be mounted at the end of the car well above the car center sill and under the end slope sheet, as indicated in FIGURE 1.

In the form shown, cam plate 82 is coupled into the brake rigging 16 by a trigger mechanism 102 mounted in working space 15. Trigger mechanism 102 includes an arm 104 fixed as by welding to the cam plate 82 and extending through housing opening 105 for pivotal connection, as by pin 107, to trigger arm 106 that is in turn pivotally connected to trigger lever 108 pivotally mounted on the car 12 at stationary pivotal connection 110 (which in the form shown is a pivot bracket 109 fixed to the car body in any suitable manner). Trigger lever 108 has its upper end 112 secured to end 114 of trigger rod 106 by pin 116 and has its lower end 118 pivotally connected to the cylinder lever 30 in the manner indicated in FIGURE 8. As indicated in FIGURE 8, trigger lever 108 is formed to define a bight portion 120 carrying a pin 122 to which the lower end 124 of the cylinder lever 30 and the end 126 of connecting rod 36 are connected. Lever 108 is pivotally connected to pivot bracket 109 as by pin 133; bracket 108 may be fixed as by welding to a convenient car body brace plate 135 or the like. The pivotal connections 32 and 110 of the cylinder lever and trigger lever respectively are to be located so that the ratio of the levers provided by the trigger lever between its ends is the same as that of the levers provided by the cylinder lever between its ends.

The adjuster housing 64 is formed to define a window 130 (see FIGURE 2) through which extends the drum or sheave chain 132 which has one end 134 thereof suitably anchored to the drum or sheave 60 and its other end suitably connected to the end 136 of cylinder lever 30 by a clevis 138 secured in place by pin 140.

The housing 64 is mounted in place in the car in any suitable manner as by an appropriate bracket structure 137 (including a mounting plate 139 that is fixed to the car end slope sheet as by welding) connected between the housing and the car which may be of any suitable design that will firmly mount the adjuster 10 in place. In the form shown, the upper end 136 of cylinder lever is given a sliding support 141 in the form of a pivotally mounted slide pin 142 riding on a pair of supports 143 disposed on either side of the cylinder lever and connected between housing 64 (as by pins 145) on either side of chamber 78 and the car end framing where indicated at 147 in FIGURE 1.

The other end of the car 12 is similarly equipped with an adjuster 10 and brake cylinder 24 and their interconnecting brake rigging 16 to operate the brakes of the truck at that end of the car. The two brake cylinders are connected to a common air reservoir in any conventional manner.

It is pointed out that in practice the adjuster housing 64 may be affixed directly to mounting plate 139, which would result in the adjuster being mounted in an inclined position with respect to the horizontal because of the inclination of the slope sheet 14. The adjuster 10 would in such case operate in the same manner as about to be described in connection with the form illustrated, which is shown horizontally disposed primarily to facilitate a ready understanding of the adjuster operation.

Operation of adjuster

A.A.R. regulations require that the brake power stroke of brake cylinder 24 be between 7 and 9 inches, although brake cylinders are customarily proportioned and applied to the car to accommodate a stroke as high as 12 inches to accommodate extreme conditions. New cars, when their brake rigging is applied and properly adjusted, should provide a brake cylinder stroke of 7 inches assuming that the car trucks have new brake shoes applied thereto, and this is true of the arrangement of this application.

As is well known in the art, brake shoes tend to wear away during each application of the car brakes, and while the brake shoe attrition is not materially noticeable for each braking operation, it is cumulative and causes an increase in the amount of slack created in the rigging as day to day use of the car proceeds. The result is that each time the car brakes are to be applied, the truck brake levers must be moved just a little further toward the wheel each time, which means that the slightly increased movement of the connecting rods 36 and the thrust or piston rod 26 (assuming no slack adjuster) is required for each time the brakes are applied. Wheel wear and connecting pin wear also contribute to this effect.

A.A.R. regulations require that when rigging slack due to brake wear and the like has proceeded to the point that the brake cylinder stroke has "over travel" of one inch (that is, exceeds the basic 7 inch brake cylinder stroke by one inch), there must be sufficient take up in the brake rigging to restore the brake cylinder to approximately its original 7 inch stroke.

The general function served by the brake adjuster and rigging arrangement of this invention is to consistently maintain the stroke of the brake cylinder 24 at the prescribed 7 inches and to automatically accommodate or effect the rigging slack take up and let out that is involved in providing such results.

The adjuster 10 and its trigger mechanism 102 is mounted and arranged so that when the adjuster has the full line positioning of FIGURE 1, the brake cylinder thrust rod 26 will have the prescribed 7 inch stroke when the car 12 is equipped with new brake shoes. In this position, the chain 132 will extend from housing 64 a maximum amount and the fulcrum 150 provided the cylinder lever 30 by its connection with the chain 132 will be disposed at its maximum distance from the housing 64.

The showing of FIGURE 2 illustrates the riding or non-operating position of the adjuster 10, in which the working pawl 70 holds the brake drum or sheave 60 against the action of its torsion spring 80 and the brake cylinder has drawn the cylinder lever to dispose its end adjacent housing 64, with the result that chain 132 hangs slack. The cam surface 84, and specifically its sector 86, holds the pawl 72 (by engagement with the laterally extended portion 151 of end 73 thereof) out of engagement with the ratchet wheel 66.

On brake operation, assuming that there has been no change in the brake shoes, the brake cylinder 24 through its thrust rod 26 moves the cylinder lever 30 to the right of FIGURE 1 about fulcrum 150 to tension chain 132 and operate the rods 36 and 44 and the truck brake levers 42 and 50 in the manner that will apply the brakes to the truck wheels 20.

Simultaneously, the connection of trigger lever 108 to the cylinder lever 30 at its end 118 provides a differential motion which results in the trigger rod 106 being moved in the direction of the arrow of FIGURE 2; this moves the cam plate 82 in a clockwise direction (that indicated by the arrow 152). As the brake cylinder moves from zero stroke to about 6½ inches of stroke, the cam plate 82 moves in the direction of arrow 152 while the brake drum or sheave 60 remains stationary under the holding action of pawl 70 while tension is being taken up in the chain 132. As this movement proceeds to the 6½ inch stroke dimension for brake cylinder 24, cam surface shoulder 92 passes under pawl 72 and permits pawl 72 to engage the adjacent teeth of ratchet wheel 66 under the action of spring 75.

At this relative positioning of the parts, the pawl 70 remains in engagement with the ratchet wheel teeth 68.

The positioning of the cam plate shoulder 90 with respect to the shoulder 92 of the cam plate 82 is such that as the brake cylinder piston moves into over travel (beyond the indicated 7 inches, due to brake shoe wear and the like), the shoulder 90 engages under the laterally extended portion 153 of pawl 70 and lifts it free of ratchet teeth 68 with the cam plate 82 continuing to move in the clockwise direction indicated by arrow 152 under the power stroke of the brake cylinder. The pawl 72 having already entered between adjacent teeth 68 of ratchet 66, tension in chain 132 is taken up, with rotation of the drum 66 in a clockwise direction being precluded by the locking action of the pawl 72 with respect to the ratchet teeth 68.

The parts are arranged in accordance with this invention so that the pawl 70 is lifted from teeth 68 at approximately the 7 inch travel dimension of brake cylinder 24 (see FIGURE 3) which is the brake setting position, that is the position where the brake shoes are seated against the wheels (assuming no shoe loss).

The rigging and adjuster then proceed through the end of the brake power stroke with the cam plate 82 continuing to move in a clockwise direction (due to brake shoe wear or loss) without further changes in the pawls 70 and 72 (see FIGURE 4).

On release, drum or sheave 60 is rotated by its spring 80 in a counterclockwise direction (see FIGURE 5) and the cam plate 82 is rotated in a similar direction by its spring 100. As the cam plate 82 moves back to and through the 7 inch travel position, pawl 72 ratchets over the teeth 68 of ratchet wheel 66 (see double headed arrow 155 of FIGURE 5), and at the 7 inch travel position the pawl 70 rides over shoulder 90 and drops into the notch defined by the first adjacent pair of teeth 68. The proportioning of cam surface sector 86 and relative location of shoulders 90 and 92 with respect thereto is arranged such that chain 132 will be shortened by the take up action of the drum under its spring 80 an amount equivalent to the brake shoe wear involved for the brake application just described. The brake drum will then be locked by pawl 70 against further rotation under the action of its spring 80 while the cam plate 82 continues to return from the 7 inch brake stroke position to zero travel under the action of its spring 100 and the action of the brake rigging in returning to zero stroke position.

It will thus be seen that the slack take up action of adjuster 10 is fully automatic and occurs after release of the brakes after each application. In the event of a brake shoe loss, the relation of the parts involved is such that the cam plate 82 is displaced from its normal riding position an amount equivalent to the increased travel caused by the loss of the brake shoes, with the result that the pawl 70 is held out of engagement with ratchet wheel teeth 68 a proportionately longer time after release and thereby permits the drum 66 to take up the chain length of chain 132 that will return the brake cylinder to its desired 7 inch stroke for the next brake application.

When the brake shoes are to be replaced, this is done by a car repairman, who pries the brake beams away from the wheels a sufficient distance to remove the old brake shoes and insert new ones. This operation rotates cam plate 82 through trigger mechanism 102 to the relative position indicated in FIGURE 6, with the cam plate moving counterclockwise of the housing and the chain drum to further position the shoulder 92 from its usual riding position with respect to pawl 72. Also drum 66 rotates clockwise under the tensioning of chain 132, that is produced by the prying procedure, to provide the necessary slack needed in the rigging to insert the shoes, and pawl 70 ratchets as indicated by double headed arrow 153.

During the next brake application, the cam plate 82 moves clockwise under the application of the brake stresses and the differential motion provided by trigger mechanism 102 (see FIGURE 7), but because the previous shortening of chain 132 due to slack take up is more than the chain length restored by prying on the brake beams to make room for the shoes, the brake cylinder will have a stroke of only say about four inches. As the brake rigging goes through the full power stroke, the chain 132 will pull on drum 66 under the tension of the stresses in the rigging and against the action of drum spring 80 to unwind the chain 132 from the drum with pawl 70 ratcheting over the ratchet wheel teeth 68 (as indicated by arrow 157).

The chain 132 will continue to unwind from the drum 60 until the cam plate shoulder 92 passes under the pawl 72, which then moves into the first exposed ratchet wheel tooth notch and this conditions the rigging so that on the next brake application the cylinder lever fulcrum 150 will be disposed at the brake setting position to provide the brake cylinder with the desired 7 inches of travel. The brake power stroke follows through to completion and on release of the brakes the parts return to the full line position of FIGURE 2 to await the next brake application.

It will thus be seen that the adjuster 10 is fully automatic for both slack take up and let out.

Furthermore, the adjusters 10 for each car are located at positions remote from the hopper outlets and well above the car center sill and associated underframe components which are conventionally located at the level indicated at 160 in FIGURE 1. Consequently, the adjusters are well isolated from application of open flame type heating arrangements to the hoppers for the aforedescribed thawing purposes.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A two way automatic brake adjuster adapted for application to a railroad car brake rigging system including a brake cylinder and piston device operatively connected to a cylinder lever operatively connected to the car truck brake apparatus, with the rigging further including a fulcrum adapted to be shifted in slack take up and let out directions to insure a brake cylinder piston stroke of substantially uniform length by compensating for brake shoe wear, loss and replacement, said adjuster comprising:

a housing and means for securing said housing to the railroad car,
a drum rotatably mounted in said housing,
a ratchet wheel keyed to said drum for rotation therewith,
a line member having one end thereof secured to said drum for winding thereon on rotation motion of said drum in a slack take up direction and the other end thereof adapted for connection to said fulcrum,
means for biasing said drum to rotate in a slack take up direction to wind said line member on said drum,
first unidirectionally acting pawl means cooperatting with said ratchet wheel for releasably locking said drum against rotation in a slack take up direction,
second unidirectionally acting pawl means cooperating with said ratchet wheel for releasably locking said drum against rotation in a slack let out direction,
means for biasing said pawl means into their respective ratchet wheel locking relation,
and slack take up and let out control means for actuating said first and second pawl means to release said drum for rotation in slack take up and let out direction to effect shifting of said fulcrum so as to maintain the brake cylinder piston stroke of substantially uniform length,
said slack take up and let out control means including cam surface means for controlling said pawl means,
said cam surface means includes a first cam surface having a first cam surface sector permitting said first pawl means to be in its locking position with said ratchet wheel under its biasing means during a predetermined amount of brake rigging power stroke, and a second cam surface sector holding said first pawl means in a position out of its locking relation with said ratchet wheel for the remainder of said brake rigging power stroke, with the adjacent portions of said cam surface sector being connected by a cam surface shoulder for moving said first pawl means between its said positions,
said cam surface means including a second cam surface having a first cam surface sector holding said second pawl means in a position out of its locking position with said ratchet wheel during a predetermined amount of the brake rigging power stroke, and a second cam surface sector permitting said second pawl means to be in its locking position with said ratchet wheel under its biasing means for the remainder of said brake rigging power stroke, with the adjacent portions of said second cam surface being connected by a cam surface shoulder for moving said second pawl means between said positions thereof,
said cam surface means being formed on a shiftably mounted cam member,
and trigger means for coupling said cam member to said rigging for differential movement relative thereto during action of said rigging to shift said cam member in the timed sequence required for slack take up and let out movements of said drum to maintain the stroke of the brake cylinder piston of substantially uniform length.

2. The adjuster set forth in claim 1:
said cam member comprises a cam plate rotatably carried by said housing adjacent said ratchet wheel and mounted for rotation about the axis of rotation of said drum,
and including means for biasing said cam plate for rotation in said slack take up direction with respect to said drum.

3. In a brake rigging arrangement for hopper cars of the type having an end slope sheet at either end thereof, which slope sheets converge downwardly of the car to define a working space between the respective slope sheets and the car center sill, and including trucks at each end of the car operatively equipped with truck brake levers for actuating the truck brakes, the improvement wherein the brake rigging comprises at each end of the car:
   a brake adjuster mounted in said working space and secured adjacent the car end slope sheet,
   a cylinder lever mounted in said work space for pivotal movement about a substantially horizontal axis and in a substantially vertical plane that extends longitudinally of the car,
   a brake cylinder mounted in said space and having its piston rod operatively connected to said cylinder lever intermediate the ends of the latter,
   with the lower end of said cylinder lever being operatively connected to the car truck brake levers at that end of the car,
   and with the upper end of said cylinder lever being operatively connected to said adjuster,
   and trigger means operatively connected between said cylinder lever and said adjuster for controlling the operation of said adjuster to position said upper end of said cylinder lever as required to maintain the stroke of said brake cylinder at a predetermined length,
   and air reservoir means for simultaneously operating said brake cylinders to operate the brake rigging at each end of the car, the upper end of said cylinder lever at each end of the car being mounted for sliding movement longitudinally of the car and forming a shiftable fulcrum for said cylinder lever, said adjusters each comprising a housing and means for securing said housing to the respective car end slope sheets, a drum rotatably mounted in said housing for rotation therewith, a line member having one end thereof secured to said drum for winding thereon on rotation motion of said drum in a slack take up direction and the other end thereof connected to said cylinder lever fulcrum at the respective ends of the car, means for biasing said drum to rotate in a slack take up direction to wind said line member on said drums, first unidirectionally acting pawl means cooperating with said ratchet wheel for releasably locking said drum against rotation in a slack take up direction, second unidirectionally acting pawl means cooperating with said ratchet wheel for releasably locking said drum against rotation in a slack let out direction, means for biasing said pawl means into their respective ratchet wheel locking relation, and slack take up and let out control means for actuating said first and second pawl means to release said drum for rotation in slack take up and let out directions to effect shifting of said fulcrum so as to maintain the brake cylinder piston stroke of substantially uniform length, said slack take up and let out control means including cam means including means for releasing said first pawl means from said ratchet wheel at a predetermined position of brake application and holding same released until the brake rigging has returned to said predetermined position to permit said drum to wind up said line member for slack take up purposes, said cam means further including means for releasing said second pawl means from said ratchet wheel when the rigging slack is below a predetermined minimum and holding same released until the rigging has returned to a predetermined position to permit the operation of said brake cylinder piston on brake application to unwind said line member from said drum to provide adjustment of said fulcrum for slack let out purposes, said cam means comprising a pivotally mounted cam plate including cam surface means for engaging the respective pawl means to move same to the released positions thereof, said trigger means coupling said cam plate to said cylinder lever for positioning said cam plate relative to said pawl means for releasing same in the sequence required during operation of the rigging to maintain the brake cylinder piston stroke of substantially uniform length.

References Cited

UNITED STATES PATENTS

| | | | |
|---|---|---|---|
| 2,620,902 | 12/1952 | Wilson | 188—198 |
| 3,136,393 | 6/1964 | Wilson | 188—198 |
| 3,156,326 | 11/1964 | Showers et al. | 188—198 |
| 3,324,977 | 6/1967 | Billeter | 188—197 |

DUANE A. REGER, *Primary Examiner.*

UNITED STATES PATENT OFFICE
CERTIFICATE OF CORRECTION

Patent No. 3,386,539                                              June 4, 1968

Thomas J. Macku et al.

It is certified that error appears in the above identified patent and that said Letters Patent are hereby corrected as shown below:

Column 8, line 7, "rotation" should read -- rotational --; line 61, "claim 1:" should read -- claim 1 wherein: --. Column 9 line 24, beginning with "the upper end" cancel all to and including "uniform length." in line 33, column 10, and insert the following:

the upper end of said cylinder lever at each end of the car being mounted for sliding movement longitudinally of the car and forming a shiftable fulcrum for said cylinder lever,
    said adjusters each comprising:
    a housing and means for securing said housing to the respective car end slope sheets,
    a drum rotatably mounted in said housing for rotation therewith,
    a line member having one end thereof secured to said drum for winding thereon on rotation motion of said drum in a slack take up direction and the other end thereof connected to said cylinder lever fulcrum at the respective ends of the car,
    means for biasing said drum to rotate in a slack take up direction to wind said line member on said drums,
    first unidirectionally acting pawl means cooperating with said ratchet wheel for releasably locking said drum against rotation in a slack take up direction,
    second unidirectionally acting pawl means cooperating with said ratchet wheel for releasably locking said drum against rotation in a slack let out direction,
    means for biasing said pawl means into their respective ratchet wheel locking relation,
    and slack take up and let out control means for actuating said first and second pawl means to release said drum for rotation in slack take up and let out directions to effect shifting of said fulcrum so as to maintain the brake cylinder piston stroke of substantially uniform length,
    said slack take up and let out control means including cam means including means for releasing said first pawl means from said ratchet wheel at a predetermined position of brake application and holding same released until the brake rigging has returned to said predetermined position to permit said drum to wind up said line member for slack take up purposes, said cam means further including means for releasing said second pawl means from said ratchet wheel when the rigging slack is below a predetermined minimum and holding same released until the rigging has returned to a predetermined position to permit the operation of said brake cylinder piston on brake application to unwind said line member from said drum to provide adjustment of said fulcrum for slack let out purposes, said cam means comprising a pivotally mounted cam plate including cam surface means for engaging the respective pawl means to move same to the released positions thereof, said trigger means coupling said cam plate to said cylinder lever for positioning said cam plate relative to said pawl means for releasing same in the sequence required during operation of the rigging to maintain the brake cylinder piston stroke of substantially uniform length.

Signed and sealed this 3rd day of March 1970.

(SEAL)
Attest:

EDWARD M. FLETCHER, JR.
Attesting Officer

WILLIAM E. SCHUYLER, JR.
Commissioner of Patents